US012812299B2

(12) United States Patent
Dupire et al.

(10) Patent No.: US 12,812,299 B2
(45) Date of Patent: Nov. 24, 2026

(54) METHOD FOR DETECTING ACOUSTIC FEEDBACK

(71) Applicant: Continental Automotive Technologies GmbH, Hannover (DE)

(72) Inventors: Jean-Philippe Dupire, Rambouillet (FR); Mike Reuter, Park Ridge, IL (US)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 19/103,369

(22) PCT Filed: Oct. 6, 2023

(86) PCT No.: PCT/EP2023/077691

§ 371 (c)(1),
(2) Date: Feb. 12, 2025

(87) PCT Pub. No.: WO2024/083522

PCT Pub. Date: Apr. 25, 2024

(65) Prior Publication Data

US 2026/0012729 A1 Jan. 8, 2026

(30) Foreign Application Priority Data

Oct. 21, 2022 (FR) ........................................ 2210908

(51) Int. Cl.
*H04R 3/02* (2006.01)
*H04R 3/00* (2006.01)

(52) U.S. Cl.
CPC ............... *H04R 3/02* (2013.01); *H04R 3/002* (2013.01); *H04R 2499/13* (2013.01)

(58) Field of Classification Search
CPC .................................. H04R 3/02; H04R 3/002
See application file for complete search history.

(56) References Cited

U.S. PATENT DOCUMENTS

| | | | | |
|---|---|---|---|---|
| 5,010,570 A * | 4/1991 | Kobylarz | H04M 9/08 | 379/406.01 |
| 5,245,665 A * | 9/1993 | Lewis | H04R 3/02 | 381/93 |

(Continued)

FOREIGN PATENT DOCUMENTS

EP 3451697 A1 * 3/2019 ............... H04R 3/02

OTHER PUBLICATIONS

English Translations of the Written Opinion of the International Searching Authority (Form PCT/ISA/237) issued Dec. 19, 2023, by the European Patent Office in corresponding International Application No. PCT/EP2023/077691. (5 pages).

(Continued)

*Primary Examiner* — Olisa Anwah
(74) *Attorney, Agent, or Firm* — Buchanan Ingersoll & Rooney PC

(57) ABSTRACT

A method for detecting acoustic feedback in a vehicle audio system including at least one microphone and one loudspeaker. The method includes the steps of computation of an acoustic acuity indicator for each frame of a plurality of successive audio frames captured by the microphone, detection of acoustic feedback when the indicator increases monotonically for a predetermined length of time, and application of a resolution strategy when acoustic feedback is detected.

9 Claims, 2 Drawing Sheets

(56) References Cited

U.S. PATENT DOCUMENTS

| | | | | |
|---|---|---|---|---|
| 7,664,275 | B2 * | 2/2010 | Osmanovic | H04R 3/02 379/406.01 |
| 11,722,822 | B2 * | 8/2023 | Grimanis | G10L 21/0216 700/94 |
| 2002/0064291 | A1 * | 5/2002 | Kates | H04R 25/453 381/318 |
| 2008/0025527 | A1 * | 1/2008 | Haulick | H04M 9/082 381/93 |
| 2008/0219459 | A1 * | 9/2008 | Bongiovi | H03G 9/005 381/57 |
| 2008/0219472 | A1 * | 9/2008 | Chhatwal | G10L 21/0208 381/94.3 |
| 2012/0087509 | A1 * | 4/2012 | Elmedyb | H04R 3/02 381/71.11 |
| 2012/0183133 | A1 * | 7/2012 | Lindstrom | H04M 9/082 379/406.01 |
| 2015/0104039 | A1 * | 4/2015 | Lee | G10L 21/0208 381/93 |
| 2015/0325251 | A1 * | 11/2015 | Dusan | G10L 21/0208 704/226 |
| 2016/0029124 | A1 | 1/2016 | Paranjpe | |
| 2016/0286309 | A1 * | 9/2016 | Acharya | H04R 3/02 |
| 2018/0350378 | A1 * | 12/2018 | Bullough | H04M 3/002 |
| 2019/0156855 | A1 | 5/2019 | Herbig et al. | |
| 2021/0250691 | A1 * | 8/2021 | Grimanis | H04R 3/02 |
| 2023/0069213 | A1 * | 3/2023 | Tu | H04R 1/326 |

OTHER PUBLICATIONS

Aures, “Sensory euphony as a function of psychoacoustic sensations”, Acoustica, (month unknown) 1985, vol. 58, No. 5, pp. 282-290.

French Search Report with full translation mailed May 30, 2023, by the France Patent Office for corresponding Application No. FR2210908. (18 pages).

International Search Report (PCT/ISA/210) with translation and Written Opinion (PCT/ISA/237) mailed Dec. 19, 2023, by the European Patent Office as the International Searching Authority for International Application No. PCT/EP2023/077691. (10 pages).

Von Bismarck, “Sharpness as an Attribute of the Timbre of Steady Sounds”, Acoustica, Mar. 1974, vol. 30, No. 3, pp. 159-172.

* cited by examiner

METHOD FOR DETECTING ACOUSTIC FEEDBACK

CROSS REFERENCE TO RELATED APPLICATIONS

This application is the U.S. National Phase Application of PCT International Application No. PCT/EP2023/077691, filed Oct. 6, 2023, which claims priority to French Application No. 2210908, filed Oct. 21, 2022, the contents of such applications being incorporated by reference herein.

DESCRIPTION

Field of the Invention

The invention relates to the field of hands-free communication systems and more particularly to detection and attenuation of acoustic feedback in such a communication system.

Background of the Invention

So-called "hands-free" communication or control devices are very commonplace in modern vehicles. In particular, these systems allow a driver to set up and continue telephone calls without removing his or her hands from the steering wheel. Such a system comprises at least one microphone and one loudspeaker associated with a multimedia processing device configured to interpret voice commands generated by an occupant of the vehicle and to transmit audible notifications, for example to acknowledge commands or provide notification of an incoming call. In such a system, an audio signal is continuously captured and processed by a microphone in order to detect therein voice commands or to transmit a speech signal to a called/calling party during a telephone call. Thus, voice notifications or telephone calls rendered by a loudspeaker are also captured by the microphone, this potentially generating feedback effects such as echo, or leading to misinterpretation of voice commands.

To avoid this, acoustic echo suppression techniques have been developed in which microphone gain is reduced when a signal is being rendered by the loudspeakers. This type of system is unsuitable for telephone calls, because not being able to hear the other person and speak simultaneously limits the fluidity of dialogues.

To improve user experience, ECNR or AEC techniques are employed (ECNR standing for Echo Cancellation Noise Reduction and AEC standing for Acoustic Echo Cancellation) in which a correlation is sought between the signal captured by the microphone and the signal rendered by the loudspeaker, in order to subtract where appropriate the rendered signal from the captured signal.

However, echo cancellers are complex devices that are not immune to malfunction. For example, an ECNR system may not converge due to a lack of system resources and allow an echo to develop. A software or hardware fault may also lead to the sound captured by a microphone being reproduced by a loudspeaker within range of which the microphone is positioned. Such a fault may occur in a remote terminal for example, an echo then being able to develop in a local terminal during an audio communication between these two terminals. In other cases, a mistake in routing audio streams in a terminal may cause an echo, for example when the signal captured by a microphone is reinjected directly into the signal generated by a loudspeaker within range of the microphone instead of being transmitted to the terminal of a called/calling party. In certain circumstances, the effect of feedback of the output to the input produces ripple that gradually increases in amplitude until the limits of the audio system are reached. Such an effect is referred to as acoustic feedback and generally manifests itself as an unpleasant whistling sound that increases in volume until the maximum power of the amplifier being used is reached.

In addition to the discomfort caused, occurrence of such an effect in a motor vehicle that is being driven may distract the driver's attention and result in a safety problem.

It is therefore necessary to ensure that such an effect cannot occur in a vehicle that is being driven. Since software faults are inherently unpredictable, such a system for preventing acoustic feedback must run constantly and use a minimum of resources, the capabilities of an automotive computer being limited.

There is thus a need for a simple technique allowing acoustic feedback to be detected and stopped in a vehicle.

SUMMARY OF THE INVENTION

To this end, a method is provided for detecting acoustic feedback in a vehicle audio system comprising at least one microphone and one loudspeaker, the method comprising the following steps:

- computation of an acoustic acuity indicator for a plurality of successive audio frames captured by the microphone,
- detection of acoustic feedback when the indicator increases monotonically for a predetermined length of time,
- application of a resolution strategy when acoustic feedback is detected.

The fundamental frequency of the sound resulting from feedback of the signal emitted by the loudspeaker via the microphone depends on various parameters (such as the acoustic properties of the place of generation, on the distance between the transmitter and receiver and on the directivity of the latter) and cannot alone be used to characterize acoustic feedback. In addition, the use of an echo canceller and noise reducer in the audio system poses a particular detection problem because the acoustic feedback is then non-linear and takes the form of ripple of increasing amplitude. The acuity indicator provides information on the ratio between the energy of the signal at high frequencies and its total energy. When such a ratio stabilizes at a value above a particular threshold, it may be characteristic of acoustic feedback.

The acoustic acuity indicator may be computed for each captured signal frame, for example on frames of 10 milliseconds. Thus, when over a certain number of consecutive frames, 40 frames for example (or over a certain length of time, 400 ms for example), the indicator increases monotonically, acoustic feedback is detected and corrective action is taken.

In one particular embodiment, the computation of the acuity indicator comprises computation of an energy spectral density of the signal captured by the microphone.

Determining an energy or power spectral density from the captured signal makes it possible to determine the frequency bands in which the energy of the signal is concentrated. The monotonicity of the acuity indicator is thus estimated from a frequency at which acoustic feedback is likely to occur.

According to one particular embodiment, the indicator is computed from frequencies greater than 2 kHz.

In this way, the method makes it possible to reject some noise from the analysis of the acoustic feedback. This increases the relevance of the indicator by focusing the analysis on high frequencies. Of course, other frequency values may be considered without modifying an aspect of the invention.

According to one particular embodiment, a resolution strategy comprises attenuation of the signal captured by the microphone, the attenuation level being proportional to the length of time since the time of detection of the acoustic feedback and to the value of the acuity indicator.

It is thus proposed to attenuate the signal captured by the microphone in case of acoustic feedback. The attenuation is variable, so that when acoustic feedback is still detected after a certain time, the captured signal is attenuated further.

Conversely, when acoustic feedback is no longer detected after attenuation has been applied for a certain number of successive frames, the attenuation level is gradually reduced until a normal situation is restored.

The attenuation level is further adjusted depending on the value of the acuity indicator, so that stronger attenuation is applied when the acuity indicator is high.

According to one particular embodiment, a resolution strategy is selected from the following strategies:

reducing amplifier volume,
reducing microphone gain,
applying a bandpass filter,
restarting the audio system.

Reducing the output level of the amplifier or reducing the gain of the microphone limits feedback of the output to the input and thus stops the acoustic feedback. Application of a bandpass filter configured to reject high frequencies allows discomfort to be limited. Resetting the audio system, for example by restarting the device to restore a stable state, allows acoustic feedback to be stopped when it is due to a software fault.

According to one particular embodiment, the method is such that the computation of the acoustic acuity indicator takes into account the influence exerted by the absolute loudness of the captured signal.

Taking loudness into account in the computation of the acuity indicator accentuates the difference that may exist between various sounds, which allows better discrimination. Such a result is particularly suitable for determining whether or not a sound has a desired characteristic. In the present case, the reliability of detection of acoustic feedback is thus improved and a resolution strategy is not triggered when the whistling caused by the acoustic feedback is not discomforting. In other words, it is proposed to apply a correction strategy only when the acoustic feedback becomes unpleasant to the user.

Furthermore, taking loudness into account makes it possible to treat only acoustic feedback that is unpleasant to the user, and therefore only loud acoustic feedback.

According to another aspect, the invention relates to a device for detecting acoustic feedback in a vehicle audio system comprising at least one microphone and one loudspeaker, the device comprising a processor and a memory in which are stored program instructions configured to implement the following steps, when they are executed by the processor:

computation of an acoustic acuity indicator for a plurality of successive audio frames captured by the microphone, detection of acoustic feedback when the indicator increases monotonically for a predetermined length of time, application of a resolution strategy when acoustic feedback is detected.

An aspect of the invention also relates to a hands-free communication system comprising a device such as described above, and to a vehicle comprising such a system.

Lastly, an aspect of the invention relates to an information medium comprising computer-program instructions configured to implement the steps of a detecting method such as described above, when the instructions are executed by a processor.

The information medium may be a non-transient information medium such as a hard disk, a flash memory or an optical disk, for example.

The information medium may be any entity or device capable of storing instructions. For example, the medium may comprise a storage means, such as a ROM (Read Only Memory), RAM (Random Access Memory), PROM (Programmable Read Only Memory), EPROM (Erasable Programmable Read Only Memory), a CD ROM or a magnetic recording means, for example a hard disk.

On the other hand, the information medium may be a transmissible medium such as an electrical or optical signal, which may be routed via an electrical or optical cable, by radio or by other means.

Alternatively, the information medium may be an integrated circuit that incorporates the program, the circuit being adapted to execute or to be used in the execution of the methods in question.

The various embodiments or features mentioned above may be added independently or in combination with each other to the steps of the detecting method. The vehicles, communication systems, devices, and information media have at least similar advantages to those conferred by the method to which they relate.

BRIEF DESCRIPTION OF THE DRAWINGS

Other features and advantages of aspects of the invention will become more clearly apparent on reading the description that follows. This description is purely illustrative and is to be read with reference to the appended drawings, in which.

DETAILED DESCRIPTION

Figure 1:
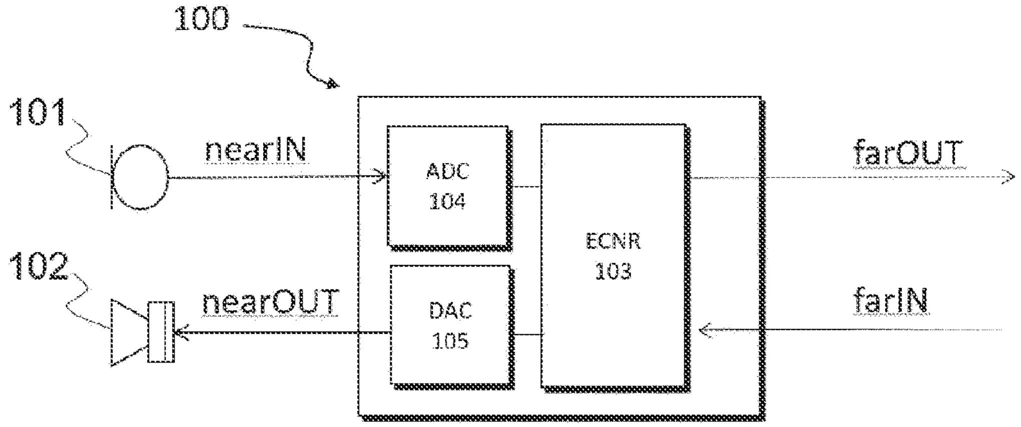
FIG. 1 shows the architecture of a hands-free audio communication device capable of being integrated into a communication system of a vehicle.

FIG. 1 illustrates in a simplified manner the architecture of a so-called "hands-free" communication device 100 able to be integrated into a vehicle. The system 100 is configured to allow simultaneously acquisition of a first audio signal denoted "nearIN" in FIG. 1 and rendition of a second audio signal denoted "nearOUT" in FIG. 1. For this purpose, the device 100 comprises at least one microphone 101 and one loudspeaker 102.

The signal captured by the microphone 101 is digitized by an analog-to-digital converter 104 and processed by an ECNR module 103 before being transmitted, in the form of a signal "farOUT", to another device, for example an interpreter of voice commands or a device making it possible to speak to a called/calling party.

In parallel, a signal "farIN" transmitted by a voice notification system or a remote communication device is processed by the ECNR module 103 before being converted into an analog signal by a converter 105 and rendered by the loudspeaker 102.

In such a so-called "hands-free" configuration, the microphone 101 captures not only the user's speech signal, but also the signal rendered by the loudspeaker 102, this being why the device 100 is equipped with an ECNR module 103.

The ECNR module 103 is configured to search for a correlation between the signal "nearOUT" and the signal "nearIN". More precisely, the module 103 searches for the signal "nearOUT" rendered by the loudspeaker 102 in the signal captured by the microphone 101, in order to cancel it out or reduce it. In simple terms, the echo cancellation consists in recognizing the signal originally emitted by the loudspeaker 102 when it reappears, with a certain delay, in the signal captured by the microphone 101. Once the echo has been recognized, it may be eliminated by subtracting it from the captured signal, for example by adding to the signal "nearIN" a signal "nearOUT" the phase of which has been inverted. Such an ECNR module is known in the art and its operation will not be discussed in greater detail.

Unfortunately, as has already been indicated, such a device may fail to work and, as a result, set up of a second feedback loop may lead to generation of acoustic feedback. Such failure may for example concern a component that loops back the "farOUT" to the "nearOUT", on which the ECNR component has no effect. Such acoustic feedback may not only be uncomfortable to the occupants of the vehicle, but also and above all cause a safety problem by distracting the driver's attention.

Figure 2:
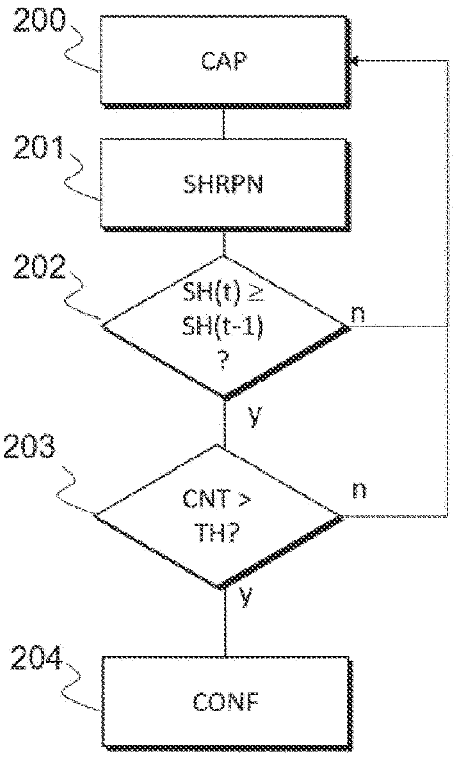
FIG. 2 is a flowchart in which the main steps of a method for detecting acoustic feedback according to one particular embodiment are shown.

One particular embodiment of the method for detecting acoustic feedback will now be described with reference to FIG. 2.

The method comprises a first step 200 of capturing and digitizing an audio signal delivered by a microphone 101. The microphone 101 is for example placed in the passenger compartment of a vehicle with a view to capturing a speech signal, such as voice commands or a telephone conversation.

The digitized signal is processed in a step 201 in order to regularly compute an acoustic acuity indicator. The indicator is for example computed on successive frames of 10 milliseconds, to obtain a plurality of indicator values allowing its variation over time to be studied.

The acuity is a psychoacoustic parameter quantifying an auditory sensation corresponding to a sensation of a sharp sound perceived to be bright or sharp. It corresponds to the ratio of the amount of energy at high frequencies to the total energy and is measured in acum (1 acum corresponds to a narrow-band noise of 1 kHz having a bandwidth less than 150 Hz and a level equal to 60 dB). The calculation of acuity is not standardized and may be determined in various ways.

In "*Sharpness as an attribute of the timbre of steady sounds*" Acustica 30(3), 159-172, von Bismark proposed in 1974 a calculation method based on the distribution of specific loudness as a function of pitch. This method does not take into account the influence exerted by absolute loudness on acuity.

In "Sensory euphony as a function of auditory sensations", Acustica 58(5), 282-290, W. Aures proposed in 1985 a corrected version of von Bismark's method so that the influence of loudness was taken into account.

This algorithm normalizes the specific-loudness spectrum by the total loudness and weights the spectrum as a function of frequency. The algorithm returns the frequency-weighted result as a specific sharpness with respect to the critical band rate, and then integrates specific sharpness to measure sharpness. Higher-frequency components in the signal generally lead to higher acuity measurements.

In one particular embodiment, the acuity indicator is computed using the method proposed by Aures, i.e. taking into account the influence exerted by loudness. Loudness expresses the sensation of the volume of a sound as perceived by a human being. This parameter is defined in such a way that a sinusoidal signal with a frequency of 1 kHz and a pressure level of 40 dB has a magnitude of 1 sone.

In one particular embodiment, the indicator is determined by computing an energy spectrum of the captured signal. For example, it is proposed to compute the power spectral density of the captured signal so as to obtain a frequency distribution of the power of the signal, depending on its component frequencies. The indicator is then determined from the power of the signal at high frequencies, for example frequencies above 2 kHz.

In step 202, the value of the indicator computed for a current digitized signal frame is compared with the value of the indicator computed for the previous signal frame in order to determine whether the value of the indicator is increasing monotonically. For this purpose, a binary monotonicity indicator may be used the value of which is initialized to "0". The monotonicity indicator is set to "1" when the indicator computed for frame n is greater than or equal to the value of the indicator computed for frame n−1, and set to "0" when it is observed that the indicator computed for frame n is less than the value of the indicator computed for frame n−1.

In step 203, the number of consecutive frames for which the monotonicity indicator is set to the value "1" is counted, and the number of frames counted is compared with a threshold in order to determine whether acoustic feedback is being generated. In one particular embodiment, the threshold is set to 40 frames. In other words, it is determined that acoustic feedback is being generated when the value of the acuity indicator increases monotonically for a predetermined length of time, 400 milliseconds for example (40 frames of 10 ms). The acoustic feedback thus detected is considered to remain in place as long as the value of the indicator does not decrease.

Lastly, the method comprises a step 204 in which a resolution strategy is implemented when acoustic feedback is detected.

According to one particular embodiment, the resolution strategy comprises reducing the gain of the microphone or the output level of the loudspeaker. For example, the gain and/or output level are gradually reduced until the acuity indicator falls below a particular threshold.

According to one particular embodiment, the resolution strategy comprises resetting or restarting the audio system.

In one particular embodiment, the resolution strategy comprises attenuating the rendered audio signal as long as acoustic feedback is considered detected. For example, an attenuation of 26 dB may be applied. It is also envisaged to apply attenuation the value of which is proportional to the value of the computed acuity indicator, so that when the acuity indicator decreases, the attenuation is reduced.

According to one particular embodiment, attenuation is no longer applied to the signal intended to be rendered when no acoustic feedback has been detected for a determined length of time, 10 seconds for example. Of course, various lengths of time may be envisaged without modifying an aspect of the invention.

Figure 3:
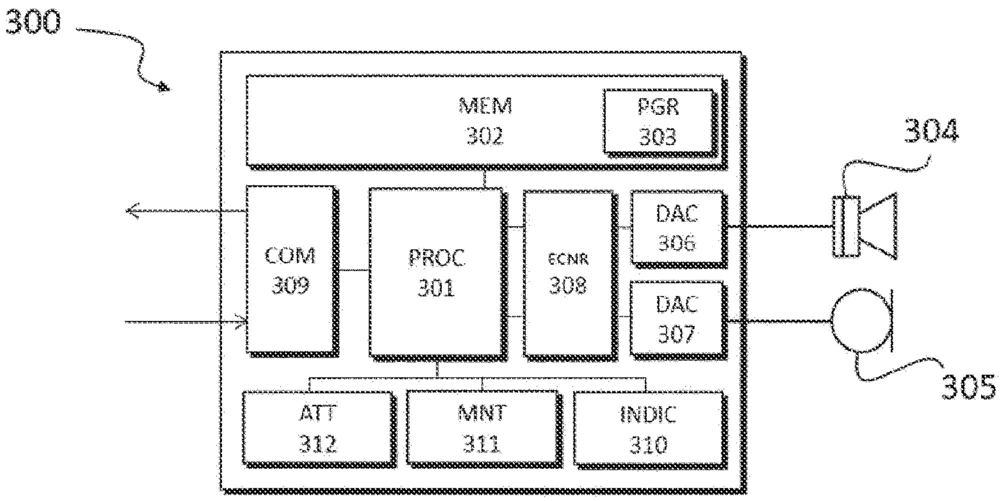
FIG. 3 shows the architecture of a device suitable for implementing the detecting method according to one particular embodiment.

FIG. 3 shows a device 300 for detecting acoustic feedback according to one particular embodiment.

The device 300 comprises a storage space 302, for example a memory MEM, a processing unit 301 equipped, for example, with a processor PROC. The processing unit may be controlled by a program 303, for example a computer program PGR, implementing the method for detecting acoustic feedback described with reference to FIG. 2 and in particular the steps of computation of an acoustic acuity indicator for each frame of a plurality of successive audio frames captured by the microphone, detection of acoustic feedback when the indicator increases monotonically for a predetermined length of time, and application of a resolution strategy when acoustic feedback is detected.

On initialization, the instructions of the computer program 303 are, for example, loaded into a RAM (Random Access Memory) before being executed by the processor of the processing unit 301. The processor of the processing unit 301 implements the steps of the detecting method according to the instructions of the computer program 303.

For this purpose, in addition to the memory and processor, the device comprises a microphone 305 and a loudspeaker 304 respectively coupled to analog-to-digital converters 306 and 307 (DAC) intended on the one hand to digitize the signal captured by the microphone 304, and on the other hand to produce an analog signal from a digital audio signal. The converters 306 and 307 are connected to an ECNR module (ECNR 308) configured to estimate a delay and a transfer function between the rendition of a signal by the loudspeaker 304 and its capture by the microphone 305, with a view to subtracting the rendered signal from the captured signal.

The device 300 also comprises a communication module 309, for example a wireless communication interface of 2G, 3G, 4G, 5G, Wi-Fi or Bluetooth type, configured to receive a digital audio signal transmitted by a device, for example a voice synthesis device of a virtual assistant or by a communication system of a called/calling party during a telephone call, and to transmit to this called/calling party or to a voice-activated control device, a digitized speech signal processed by the module ECNR 308.

The device 300 also comprises a module 310 for computing an acuity indicator. The module 310 is for example configured by computer-program instructions to obtain a digitized audio-signal frame, a frame of 10 milliseconds for example, captured by the microphone 305, to apply an algorithm allowing a power spectral density to be computed, and to select frequencies above a threshold, frequencies above 2 kHz for example, the acuity indicator being characteristic of the power of the audio signal captured in the selected bands.

According to one particular embodiment, the module 310 is configured by computer-program instructions to compute an acuity indicator according to the method proposed by Aures described above.

The device also comprises a module 311 configured to compare the value of the acuity indicator computed for at least two successively captured frames, frames of 10 milliseconds for example, and to determine whether the value of the indicator is increasing monotonically. The module 311 is further configured to determine that acoustic feedback is being generated when it is determined that the acuity indicator has increased monotonically for a predetermined length of time, 400 milliseconds for example, i.e. 40 frames of 10 milliseconds.

The device lastly comprises a module 312 for applying a resolution strategy. The module 312 may be implemented by computer-program instructions configured to reduce the output level of the signal delivered to the loudspeaker 304 and/or reduce the gain of the microphone 305 for as long as feedback is being generated, to apply a bandpass filter, for example a low-pass filter allowing high frequencies, for example frequencies greater than 2 kHz, to be rejected, or indeed to restart the audio system.

According to one particular embodiment, the device 300 is integrated into a hands-free communication system of a vehicle.

The invention claimed is:

1. A method for detecting acoustic feedback in a vehicle audio system comprising at least one microphone and one loudspeaker, the method comprising:

computation of an acoustic acuity indicator for each frame of a plurality of successive audio frames captured by the microphone, detection of acoustic feedback when the indicator increases monotonically for a predetermined length of time, and application of a resolution strategy when acoustic feedback is detected.

2. The method as claimed in claim 1, wherein the computation of the acuity indicator comprises computation of an energy spectral density of a signal captured by the microphone.

3. The method as claimed in claim 2, wherein the indicator is computed from frequencies greater than 2 kHz.

4. The method as claimed in claim 1, wherein the resolution strategy comprises attenuation of a signal captured by the microphone, the attenuation level being proportional to a length of time since detection of the acoustic feedback and to the value of the acuity indicator.

5. The method as claimed claim 1, wherein a resolution strategy is selected from the following strategies:

reducing amplifier volume, reducing microphone gain, applying a bandpass filter, restarting the audio system.

6. The method as claimed in claim 1, wherein the computation of the acoustic acuity indicator takes into account an influence exerted by an absolute loudness of a signal captured by the microphone.

7. A device for detecting acoustic feedback in a vehicle audio system comprising at least one microphone and one loudspeaker, the device comprising a processor and a memory in which are stored program instructions configured to implement the following steps, when they are executed by the processor:

computation of an acoustic acuity indicator for a plurality of successive audio frames captured by the microphone, detection of acoustic feedback when the indicator increases monotonically for a predetermined length of time, and application of a resolution strategy when acoustic feedback is detected.

8. A hands-free communication system comprising the device as claimed in claim 7.

9. A vehicle comprising the hands-free communication system as claimed in claim 8.

* * * * *